Sept. 14, 1954  J. SUNNEN  2,688,792
UNIVERSAL FLY CUTTING TOOL
Filed Jan. 6, 1950  4 Sheets-Sheet 1
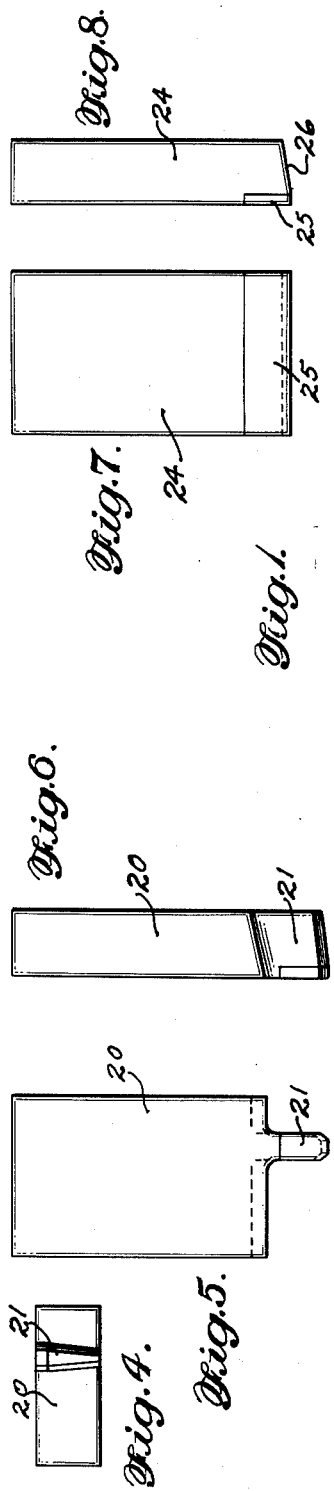
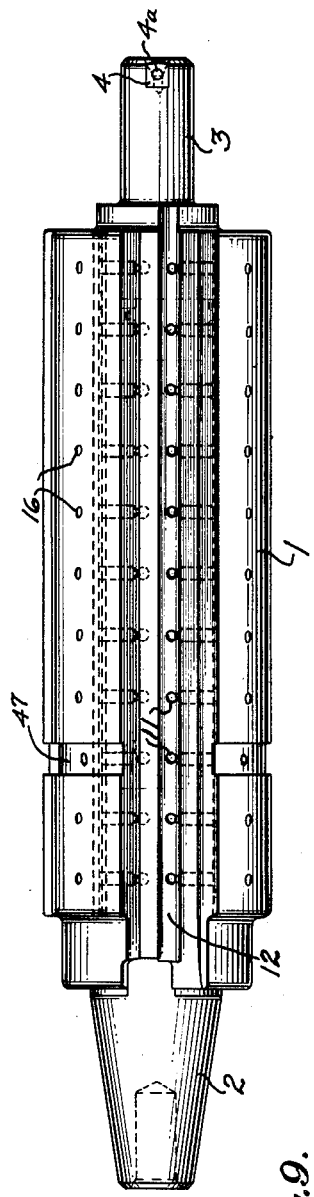
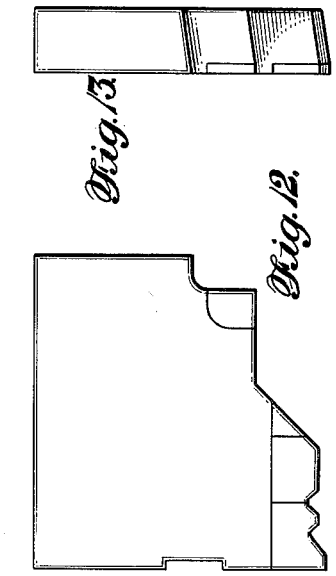
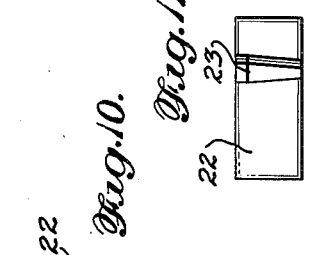
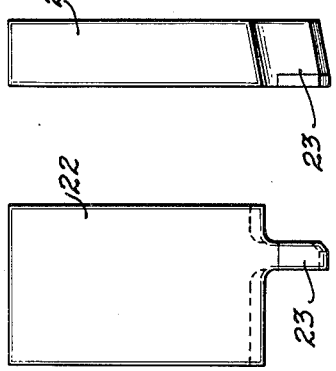
*INVENTOR.*
JOSERH SUNNEN
BY
*George R. Ericson*
ATTORNEY Sept. 14, 1954  J. SUNNEN  2,688,792
UNIVERSAL FLY CUTTING TOOL
Filed Jan. 6, 1950  4 Sheets-Sheet 3

INVENTOR.
JOSEPH SUNNEN
BY
ATTORNEY

Sept. 14, 1954   J. SUNNEN   2,688,792
UNIVERSAL FLY CUTTING TOOL
Filed Jan. 6, 1950   4 Sheets-Sheet 4
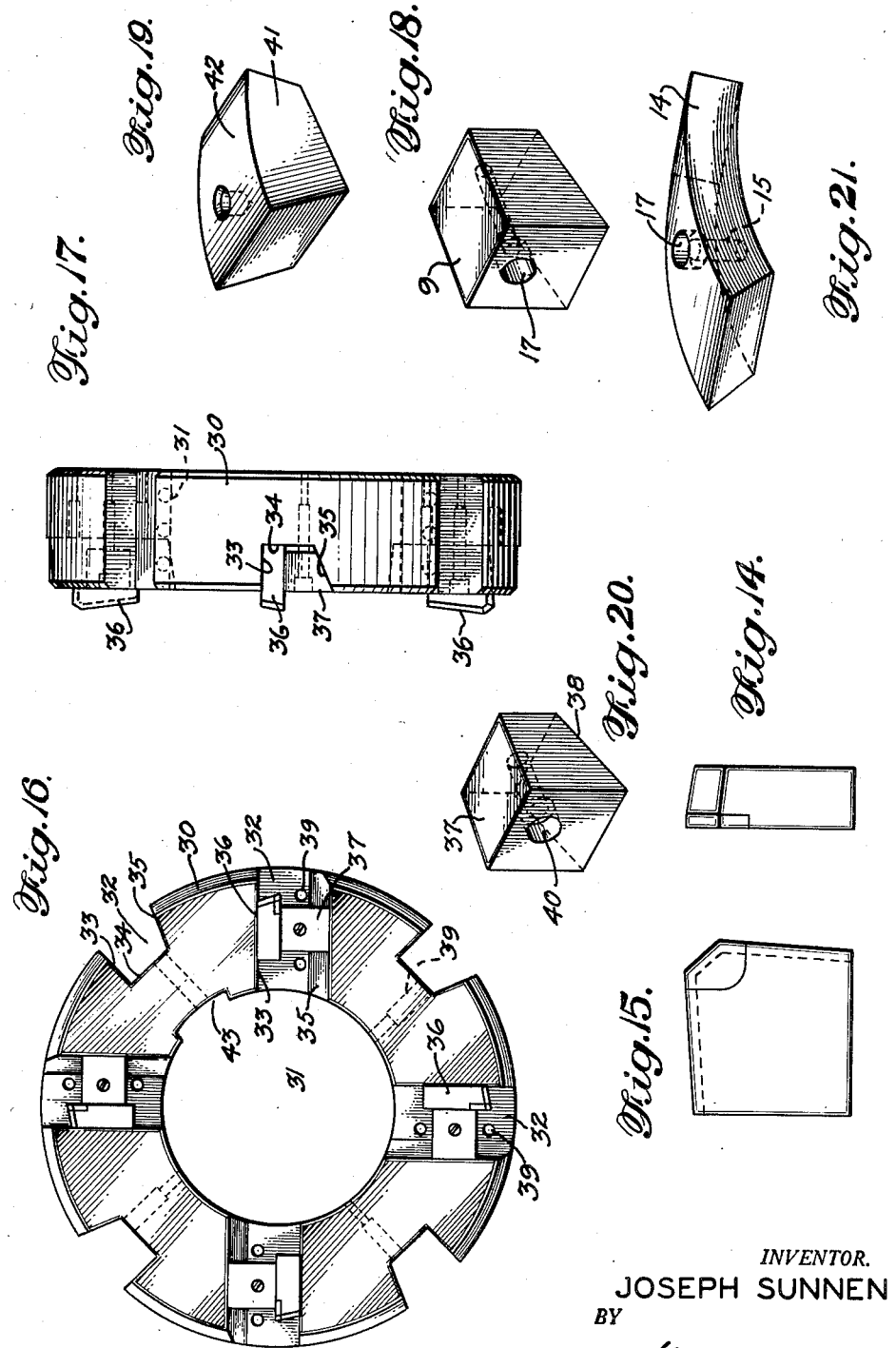
INVENTOR.
JOSEPH SUNNEN
BY
ATTORNEY Patented Sept. 14, 1954

2,688,792

UNITED STATES PATENT OFFICE 2,688,792

UNIVERSAL FLY CUTTING TOOL

Joseph Sunnen, Clayton, Mo.

Application January 6, 1950, Serial No. 137,125

4 Claims. (Cl. 29—105)

This invention relates to improvements in universal fly cutting tools, and more particularly to the provision of a new and improved gang arbor with detachable holders and sets of fly cutting tools capable of being quickly and rigidly set up from a small stock of cutters to cut any one of a large number of shapes, mouldings, forms or the like, over any desired widths of surface up to the length of the arbor.

As is well understood by those skilled in the art, the building of forming tools for milling machines is an expensive operation which makes it impossible to obtain either a quick or an inexpensive set-up for different jobs and forming tools when so made are difficult to sharpen, as well as being completely inflexible as to the length and shape of the cut.

The main object of this invention is to provide a universal gang arbor of substantial length having surfaces for rigidly supporting a plurality of comparatively short fly cutters at suitable points for accomplishing a series of cuts of a predetermined pattern, the supporting surfaces of the arbor being so formed and arranged as to accommodate a maximum number of tools arranged in necessary relationship without unnecessarily reducing the strength and rigidity of the arbor body.

It is a further object of the invention to provide a gang arbor of the character described in the preceding paragraph, having means for rigidly attaching any two or more of the fly cutters in positions overlapping each other to any desired extent, whereby the width of the entire cut may be varied as desired without the necessity of making cutters of special lengths to fit special jobs.

It is a further object of the invention to provide a gang arbor for fly cutters having cutter receiving grooves parallel with the axis, means for holding any two desired fly cutters in overlapping relation in any one of said grooves, said grooves and said holding means being so constructed and arranged as to present the cutting edges of the leading and following tools to the work with equal clearances and equal drag, regardless of which tool is selected by the operator as the leading tool for that groove.

It is a further object of the invention to provide a gang arbor for use in form cutting and other milling operations, and in which both roughing and finishing cuts may be taken in a single pass across the work.

It is a further object of the invention to provide a universal fly cutting tool the set up for any desired surface permits the use of substantially standard individual forming tools, and the overlap of each cutting tool by others following it, so that no burrs are left at the junctions of the cutting tracks.

It is a further object of the invention to provide a universal fly cutting tool having a pair of face mill holders adjustably and removably mounted along its axis.

More specifically the invention comprehends the use of a mandrel body formed with a series of longitudinal slots designed and arranged to receive suitable cutters of predetermined type and conformation in a manner to permit their infinitely variable adjustment with respect to the length of the mandrel and with respect to each other, whereby the set up of the tools for any desired work may be accomplished in a simple operation and in accordance with any required specifications, the cutters being secured by a wedge lock and screws arranged in the slots and interposed between pairs of cutting elements, and out of the path of longitudinal adjustment of the cutters.

Another object of the invention is the provision of face cutters, holders or mill bodies which are designed for quickly removable and adjustable arrangement on the arbor body, to cooperate with the cutters carried in the slots of the arbor to insure proper and related end face milling operations, each of the facing cutter bodies being provided with radial tool receiving slots and tool receiving slots on the periphery in which interchangeable lock wedges are utilized to cooperate with suitable cutters, the construction being such that the cutters themselves are adjustable and interchangeable to accomplish work in accordance with any desired specification.

Other features of the invention reside in the provision of cutters, lock wedges, cutter bit supports, and other parts, all of which are designed for interchangeable arrangement and association to provide a universal cutting tool for milling and analogous operations with a minimum of expense in the cost of the cutters and a minimum of time for tooling of the cutters for a predetermined plurality of simultaneous associated operations.

Other objects of this invention will more clearly hereinafter appear by reference to the accompanying drawings and specification wherein like characters of reference designate corresponding parts throughout the several views, in which:

Fig. 1 is a side elevation of the mandrel of the universal fly cutting tool showing one of the longitudinal grooves and the relative position of the threaded holes throughout the length of the arbor;

Figure 22:
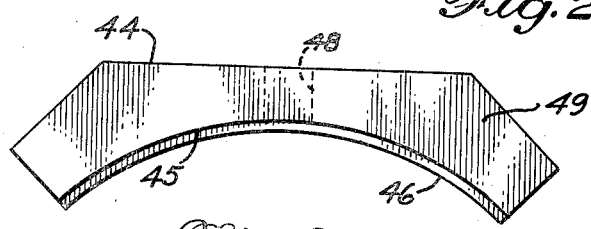
Figure 23:
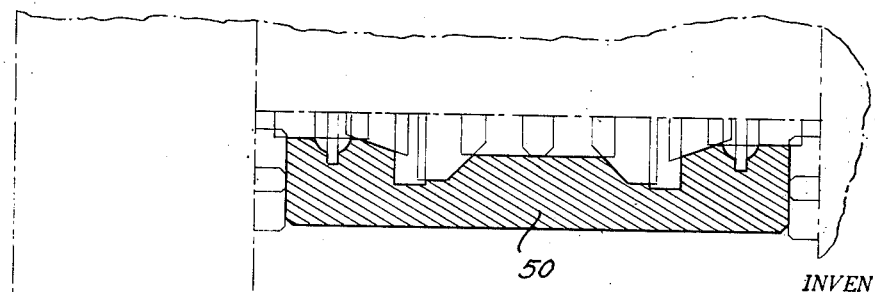

Figs. 4, 5, and 6 disclose plan side and end views of a typical slot roughing cutter to be used with the arbor;

Figs. 7 and 8 show plan and side views of a plain or slab cutter;

Figs. 9, 10, and 11 show plan, side, and end views of a slot finishing cutter;

Figs. 12 and 13 show side and end views of a forming tool;

Figs. 14 and 15 disclose a corner chamfering cutter;

Fig. 16 is a side elevation of the face mill body;

Fig. 17 is a front elevation of the structure of Fig. 16;

Fig. 18 is a perspective view of the lock wedge used on the arbor;

Fig. 19 is a perspective view of the face mill key;

Fig. 20 is a perspective view of the lock wedge used on the face mill;

Fig. 21 is a perspective view of the cutter bit support;

Fig. 22 is a side elevation of the tool positioning yoke;

Fig. 23 is a diagrammatic view of the work and relative positions of the various bits in the arbor and face mill.

Figure 2:
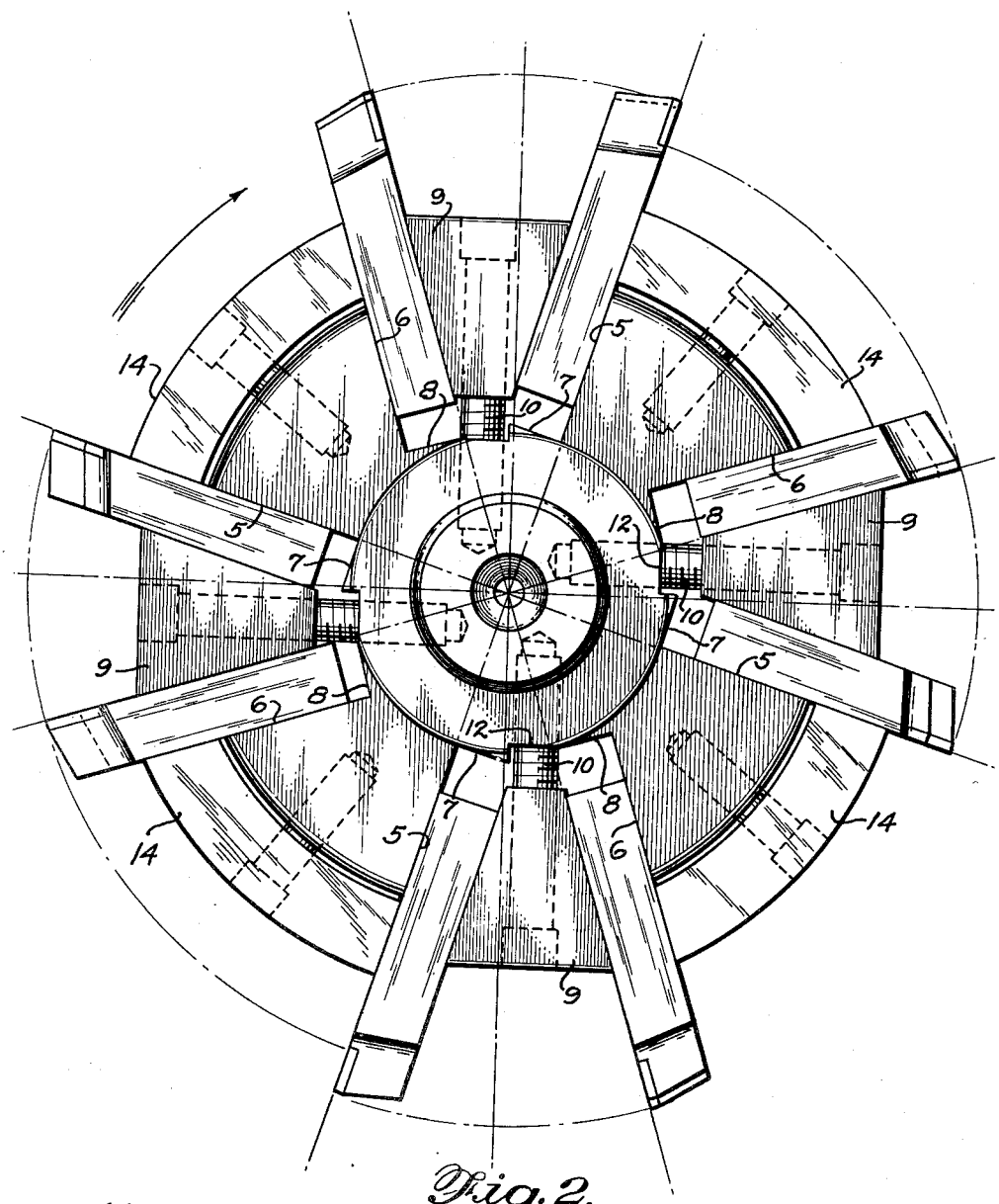
Fig. 2 is an end elevation showing the device of Fig. 1 on a larger scale and with the cutters and lock wedges and cutter bit supports in position.
Figure 3:
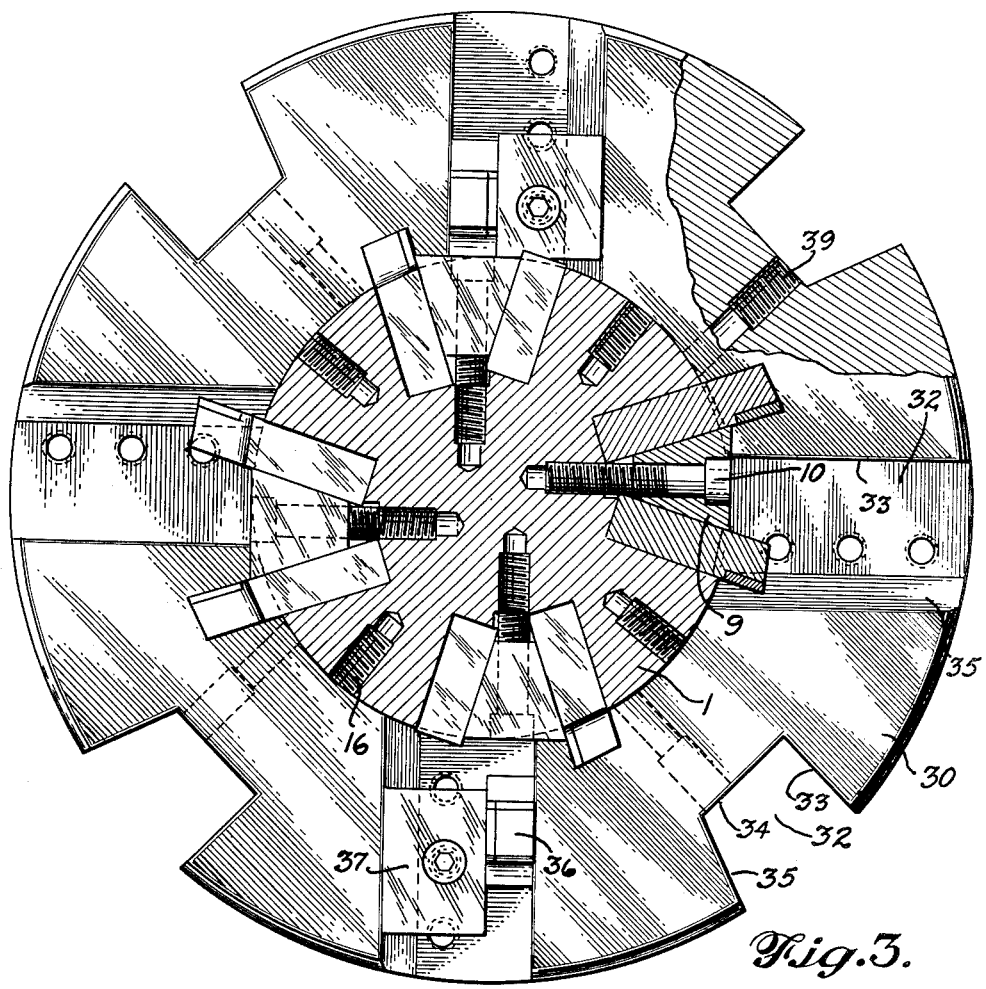
Fig. 3 is a cross section of the arbor showing one of the face mills in position.

Referring now to Figs. 1, 2 and 3 the body or arbor structure of the universal fly cutting tool is in the form of an elongated cylinder 1, having the tapered socket extremity 2, the taper being suitable for association with standard milling machines, and the reduced extremity 3 which is of such a diameter as to receive a standard bearing sleeve to permit the use of the device on well known standard outer bearing supports now conventional in the art. The reduced extremity 3 of the arbor 1 is provided with a flat 4 and countersink 4a to receive a suitable set screw or other fastening means carried by the sleeve, whereby they may be locked in position.

Referring now to Fig. 2 it will be noted that the four tool receiving slots are formed at diametrically opposite points about the periphery of the arbor 1 and extend longitudinally throughout the body. The side walls of each of the slots are indicated by reference characters 5 and 6 and are finished flat faces against which the tools will abut in the manner hereinafter described. Each of the walls 5 of each of the longitudinal tool slots of the arbor 1 lie in a plane intersecting the axis of the arbor and obviously are spaced at 90° about the structure. These forward walls 5 of each of the slots form one of the supports for a pair of cutters and inasmuch as the arbor turns clockwise, the arrangement of the tools against the wall inherently positions the cutting face of the tool against this wall 5 in the plane of the axis of the arbor. The rear wall 6 is offset a distance comprehended by the thickness of the tool body so that the cutter which is supported by this wall has its cutting face lying in a plane intersecting the axis of the tool in accordance with the companion cutter of the slot. This arrangement of the walls 5 and 6 of each of the slots positions the pair of cutters so that their working faces travel in the same arc with respect to the arbor axis, and to permit this association, the bottoms 7 and 8 of the slots are arranged at 90° with respect to the side walls 5 and 6. This arrangement permits the right angle ends of the tools to seat firmly when they are inserted to the bottom of the slots, although by means of the lock wedges 9, which are arranged between a set of tools, the cutters can be adjusted radially to perform any depth of cutting operation. If deemed necessary, shims may be placed between the cutters and the bottoms 7 and 8. The wedges 9 are provided with a medial bore to receive hardened screws 10 which are threaded into the proper threaded radial openings 11 extending longitudinally throughout the intermediate flat longitudinal faces 12 formed medially of the slots. It will be apparent from the foregoing that when the arbor is tooled for a predetermined operation a pair of roughing cutters can be simultaneously clamped in proper relative adjusted position against the opposed walls 5 and 6 of one of the slots by means of the lock wedge 9 and when properly adjusted to perform their respective cutting operations can be clamped by the screw bolts 10. Where a pair of cutters are adjusted outwardly so that they extend a substantial distance from the body of the arbor, a cutter bit support 14, shown in detail in Fig. 21, will be inserted between an adjacent pair of cutters of adjacent tool slots, as shown in Fig. 2, and will comprise a support for these cutters. The bit support arcuate plates 14 are formed with a central screw opening 15 for axial alignment with the screw opening 16 to permit positioning and securing of these parts. The screw openings in the lock wedges of Fig. 18 and the supports of Fig. 21 are recessed as at 17 for the seating of the head of the screw when the parts are assembled.

Inasmuch as the present universal fly cutting assembly is designed for a plurality of simultaneous operations on a single work piece, a multiplicity of cutters of predetermined design are required to accomplish any particular multiple cutting operation. In the present instance the set of cutters for use in performing a certain predetermined multiple cutting operation is shown as including the structures of Figs. 4 to 15, inclusive. In Figs. 4, 5 and 6 a slot roughing cutter has been illustrated in top, plan and side elevation, respectively. This slot roughing cutter consists of the relatively elongated body 20 and the projecting cutter end 21, the body being of standard thickness and the cutter being of standard type to perform the conventional roughing cut, with the work surface concentrated throughout the medial portion of the cutting face and the corner cut away to facilitate the operation. In association with the roughing cutter, the finishing cutters of Figs. 9, 10 and 11 are provided with the same shaped bodies, having the same dimensions, and indicated by reference character 22. The finishing cutter faces indicated at 23 are designed to remove from the work the material left at the corners of the slots by the roughing cutter and for this purpose have one side of the cutter finished at 90° for the intended purpose. Obviously these finishing cutters, to accomplish the clearing of the slot at the opposite edge can be reversed. It will be noted that the roughing cutters and finishing cutters have identical bodies and essentially this is true throughout all of the tools which may be utilized in connection with the arbor, as it is desirable that the lock wedges 9 be of a single size to avoid complications in assembling. In Figs. 7 and 8 there has been illustrated a slab cutter bit in which the body 24 has at its working edge the elongated carboloy tip 25. The wall of the body of the slab cutter recedes slightly as indicated at 26 as is conventional in such structures to permit clearance of the tool in its rotation with the arbor structure.

In Figs. 12 and 13 a contour cutter is shown having several cutting faces. The cutting faces are made of carboloy as in the instance of the other cutting devices and the actual shape of the contour cutter is a matter of preselected design, in accordance with the pattern to be produced.

In Figs. 14 and 15 there is illustrated a front and side view of a corner chamfering cutter. The cutting faces are made of carboloy as in the instance of the other cutters.

In Figs. 16 and 17 there is shown a front and side elevation of a face mill, the mill body 30 being of cylindrical form and having a central opening 31 of such a diameter as to be snugly seated on the arbor structure 1. The mill body may be held in a fixed position on the arbor by a set screw or by the key 41 shown in detail in Fig. 19. The key 41 is of such shape as to snugly fit into one of the tool receiving grooves of the arbor while the arcuate upper portion 42 is receivable in the key way 43 in the mill body. One of the lateral faces of the mill body is provided with a plurality of radial tool slots 32. The periphery of the mill body is also provided with a plurality of tool slots 32. All tool slots in the mill body are identical and are defined by the flat wall 33, base 34 at 90° to the wall 33, and angular wall 35, it being intended that the cutting tool 36 to be used in each of the tool recesses will abut against the flat face 33, seating against the base 34 and being held in position by the wedge 37. The clamp wedge 37 is shown in detail in Fig. 20, this wedge having faces conforming to the tool recesses heretofore defined and including the angular face 38 which abuts against the angular faces 35 of the recesses. These wedges are drilled at 40 to receive a lock screw, the screw opening located at a proper position to apply suitable force from the wedge faces 35—38 against the tool 36 which is clamped between the wedge and the face 33 of the tool receiving recess. It will be noted that the finishing tools are adjustable throughout the length of the tool receiving recesses, this adjustment being provided for by a plurality of screw-openings 39 which receive the screw which projects through the wedge block. In the present disclosure three screw openings are provided in each tool receiving recess which will permit an infinite number of separate adjustments of the tools. Obviously any suitable number of screw openings can be provided.

To facilitate accurate longitudinal positioning of the cutter bits in the arbor, an indicating face is provided by a reference plate 44 having one arcuate side 45 as shown in Fig. 22. A depending portion 46 fits snugly into groove 47 in the periphery of the arbor, and the plate may be secured to the arbor by a bolt passing through the medial hole 48 and threaded into one of the openings 11. The arcuate plate is of such length as to bridge the tool receiving slot and present a true transverse surface from which the cutter bits may be accurately positioned longitudinally in the tool receiving slots.

A piece of work 50 may be machined to a finished contour as illustrated in Fig. 23 by the above described universal fly cutting tool. The cutter bits in the face mills finish the outer edges of the work while cutter bits secured in the arbor mill the entire upper face of the work. It becomes apparent that by being able to overlap the cutter bits longitudinally about the arbor there will be no burrs left and the work can be finished in one operation.

From the foregoing it will be obvious to one skilled in the art that an arbor structure has been provided which is capable of rigidly supporting in a preselected manner a multiplicity of cutters capable of working a specified pattern, the supporting surfaces formed in the arbor being furnished in such a manner as to maintain a rigid body, which is reinforced by the use of clamping wedges and backing pieces used in securing the several tools in their respective positions. This accomplishment is extremely critical inasmuch as the nature of the work of a milling cutter inherently develops forces tending to set up vibrations and distortions unless extreme rigidity is maintained. When a multiplicity of cutters are used in a single operation and carried by a single arbor these forces are vastly multiplied and any of the conventional methods of providing for the support of the tools would be impractical. By the present structure the compact rigidity of the arbor is maintained and it is possible to arrange the desired number of cutters in any selected pattern.

What I claim is:

1. A composite rotary cutter comprising an arbor having a cylindrical main body portion and a driving shank portion at one end thereof, a plurality of circumferentially spaced, longitudinal grooves in said body portion, said grooves having outwardly diverging side walls and said grooves extending longitudinally the full length of said body portion in parallel relationship and being of uniform width and depth throughout, circular milling cutters having central bores slidably fitted on said cylindrical body portion, and a plurality of individual flat cutter bits entered into said grooves and arranged circumferentially and longitudinally on said body portion, said cutter bits being of the same thickness and being thinner than the width of said grooves, means whereby said cutter bits and said circular cutters are interchangeably locked in any position along said body portion comprising wedge elements entered into said grooves in face to face relationship with one side of said cutter bits, and screw means passing through said wedge elements and engaged in longitudinally spaced, tapped holes in the bottoms of said grooves for forcing said wedge elements radially into said grooves so as to clamp the other side of said cutter bits against a side wall of said grooves, and keys having a portion fitted into said grooves and slidable longitudinally therein and having another portion fitted into a radial keyway formed in each of said circular cutters, and screw means carried by each of said circular cutters and acting radially on said keys to force them downwardly into said grooves.

2. A device as claimed in claim 1 being further characterized by the uniform circumferential spacing of said grooves and by the provision of interchangeable tool backing plates of arcuate shape which are detachably fixed to the surface of said body portion by screws engaged in longitudinally spaced, tapped holes in said body portion, and which arcuate backing plates extend circumferentially from the leading face of one cutter bit to the rear face of an aligned cutter bit mounted in the circumferentially adjacent slot.

3. A device as claimed in claim 1, in which at least one circular cutter is of the inserted blade type comprising a centrally bored, short, cylindrical body having identical tool receiving grooves with outwardly diverging side walls, which identical grooves extend radially on a face of said body and axially on the periphery thereof, and in which grooves are mounted for longitudinal adjustment therein, interchangeable, flat, cutter bits of identical thickness, and in which grooves are entered, one adjacent each cutter bit, identical interchangeable, tool-locking, wedge elements, which wedge elements are forced downwardly into said grooves to lock said cutters in longitudinally adjusted position in said grooves by screw means passing through each of said wedge elements and engaged in any of a series of longitudinally spaced, tapped holes in the bottoms of said grooves.

4. A device as claimed in claim 1, in which the cylindrical main body of the arbor is additionally provided with a relatively shallow, circumferential groove and a transverse reference plate projecting substantially above the surface of said arbor and having an arcuate portion nicely fitting in said circumferential groove and bearing against the arcuate bottom of said groove, and screw means passing radially through said reference plate and engaging any of a continuous series of longitudinally spaced, tapped holes in the bottom of said circumferential groove, whereby the reference plate can be detachably mounted in any of a number of aligned, circumferentially spaced positions on said arbor.

References Cited in the file of this patent

UNITED STATES PATENTS

| Number | Name | Date |
|---|---|---|
| 481,656 | Renold et al. | Aug. 30, 1892 |
| 1,411,390 | Tibbets | Apr. 4, 1922 |
| 1,472,960 | Conklin | Nov. 6, 1923 |
| 1,533,314 | Fox | Apr. 14, 1925 |
| 1,691,983 | Miller | Nov. 20, 1928 |
| 1,890,452 | Benninghoff | Dec. 13, 1932 |
| 1,913,486 | Head | June 13, 1933 |
| 2,155,595 | Harten | Apr. 25, 1939 |
| 2,229,112 | Miller | Jan. 21, 1941 |
| 2,283,481 | Womble | May 19, 1942 |
| 2,306,798 | Benninghoff | Dec. 29, 1942 |
| 2,407,921 | Delisso | Sept. 17, 1946 |
| 2,408,787 | Lowell | Oct. 8, 1946 |
| 2,409,776 | Maples | Oct. 22, 1946 |
| 2,493,039 | Sochia | Jan. 3, 1950 |

FOREIGN PATENTS

| Number | Country | Date |
|---|---|---|
| 194,583 | Germany | Jan. 25, 1908 |
| 434,233 | Germany | Sept. 17, 1926 |
| 622,810 | Great Britain | May 6, 1949 |
| 704,161 | Germany | Mar. 25, 1941 |